United States Patent [19]

Mizuno et al.

[11] Patent Number: 5,774,043

[45] Date of Patent: Jun. 30, 1998

[54] VEHICULAR ANTITHEFT APPARATUS USING AN IDENTIFICATION CODE TRANSMITTED FROM A KEY TO ALLOW ENGINE STARTING

[75] Inventors: Yoshiyuki Mizuno; Sadao Kokubu; Hisashi Aoki; Takashi Mizuno, all of Aichi, Japan

[73] Assignee: Kabushiki Kaisha Tokai Rika Denki Seisakusho, Aichi, Japan

[21] Appl. No.: 296,894

[22] Filed: Aug. 29, 1994

[30] Foreign Application Priority Data

Aug. 30, 1993 [JP] Japan .................................. 5-46932 U
Sep. 7, 1993 [JP] Japan .................................. 5-221715

[51] Int. Cl.[6] .................................................. B60R 25/10
[52] U.S. Cl. ...................... 340/426; 340/542; 340/539; 340/825.32; 307/10.2; 307/10.5
[58] Field of Search .................................. 340/426, 542, 340/543, 539, 825.32, 825.31, 825.3; 307/10.1, 10.2, 10.3, 10.5, 10.6, 10.4; 70/336, 382, 416

[56] References Cited

U.S. PATENT DOCUMENTS

| | | | |
|---|---|---|---|
| 4,222,034 | 9/1980 | Orenzow | 307/10.5 |
| 4,296,402 | 10/1981 | Szczepanski | 307/10.5 |
| 4,835,407 | 5/1989 | Kataoka et al. | 307/10.5 |
| 4,868,409 | 9/1989 | Tanaka et al. | 307/10.5 |
| 4,996,514 | 2/1991 | Sunami | 340/426 |
| 5,043,593 | 8/1991 | Tsutsumi et al. | 307/10.2 |
| 5,086,288 | 2/1992 | Stramer | 340/426 |
| 5,132,667 | 7/1992 | Cranford | 340/542 |
| 5,457,438 | 10/1995 | Ziegler | 340/426 |
| 5,477,214 | 12/1995 | Bartel | 340/825.31 |

FOREIGN PATENT DOCUMENTS

| | | |
|---|---|---|
| 38 36 458 | 5/1989 | Germany . |
| 93 06 264 | 8/1993 | Germany . |
| 2 209 050 | 4/1989 | United Kingdom . |
| 93 02897 | 2/1993 | WIPO . |

*Primary Examiner*—Jeffery Hofsass
*Assistant Examiner*—Davetta Woods
*Attorney, Agent, or Firm*—Finnegan, Henderson, Farabow, Garrett & Dunner, L.L.P.

[57] ABSTRACT

When an ignition switch detects that a key rotor of an ignition key cylinder has been turned to the accessory position by a key, a controller energizes a primary coil to cause it to output a high-frequency signal. In the key, a secondary battery is charged with a constant DC voltage generated from an AC voltage induced across a secondary coil. A transmission circuit is powered by the secondary battery, and allowed by a timer circuit to transmit a radio signal including an identification code during a predetermined period after the high-frequency signal is received by the key. Alternatively, the controller energizes the primary coil plural times with a cycle consisting of predetermined output and pause periods if the transmitted identification code does not coincide with a preset identification code at the first comparing attempt.

6 Claims, 7 Drawing Sheets

VEHICULAR ANTITHEFT APPARATUS USING AN IDENTIFICATION CODE TRANSMITTED FROM A KEY TO ALLOW ENGINE STARTING

BACKGROUND OF THE INVENTION

The present invention relates to a key to be inserted into an ignition key cylinder and incorporating a transmission circuit for transmitting an air propagation signal and a battery as a DC power supply for the transmission circuit. The invention also relates to a vehicular antitheft apparatus in which the key being inserted in the ignition key cylinder is caused to transmit an air propagation signal having a particular code and a power-on signal is validated when a match is found between the transmitted particular code and a prestored particular code.

Recently, there exist vehicles, for instance, automobiles, which employ what is called a wireless door-locking apparatus. In this apparatus, a transmission circuit and a battery as a DC power supply for the transmission circuit are provided in a base portion of a remote key that can be inserted into an ignition key cylinder and a door key cylinder. When a driver performs an operation to cause the transmission circuit to emit a radio signal, a reception signal judging means in a receiving circuit that is provided in an automobile decodes the radio signal and a controller outputs a drive signal to cause a door locking mechanism (electromotive actuator) to automatically lock or unlock a door.

The above wireless door-locking apparatus is very convenient to the driver, because he can automatically lock or unlock the door simply by depressing an operation button to cause the transmission circuit to effect its transmission operation; that is, he need not insert the remote key into the door cylinder and turn it.

However, with the conventional constitution, when the battery as the power supply for the transmission circuit has lost its energy, the transmission circuit cannot emit a radio signal, so that the locking and unlocking operations through the radio signal become disabled.

In the above wireless door-locking apparatus, a radio signal transmitted from the remote key includes a code for identifying a corresponding automobile, and the door locking mechanism does not operate unless a match of identification codes is found even when a lock signal or unlock signal is sent from another remote key. As the number of bits is increased, the number of identification codes rapidly increases to make it difficult for a third person to find a particular identification code. Thus, the apparatus is very safe from theft.

When a driver inserts a remote key into an ignition key cylinder and turns a key rotor to the START position by means of the remote key, a starter operates to start the engine to enable driving of the automobile. However, for example, even when a person other than the driver who has the regular remote key inserts some false thing (e.g., skeleton key) into the ignition key cylinder and turns the key rotor to the START position, the engine may also be started.

To solve this problem to thereby improve security, there has been proposed an apparatus in which an identification code sent from a remote key is received by a circuit incorporated in an ignition key cylinder, and compared with a registered identification code by a controller. When a match is found between the two identification codes, an engine starter relay is enabled.

For example, the above apparatus is constructed as follows. In addition to an ignition switch for detecting the turning position of the key rotor, a key position switch for detecting key insertion is incorporated in the ignition key cylinder portion. Further, a key coil is provided inside the ignition key cylinder so as to supply a high-frequency signal to the remote key as a trigger signal to cause it to output an identification code. With this constitution, it is judged in the following manner whether the inserted remote key is the regular one.

Figure 1:
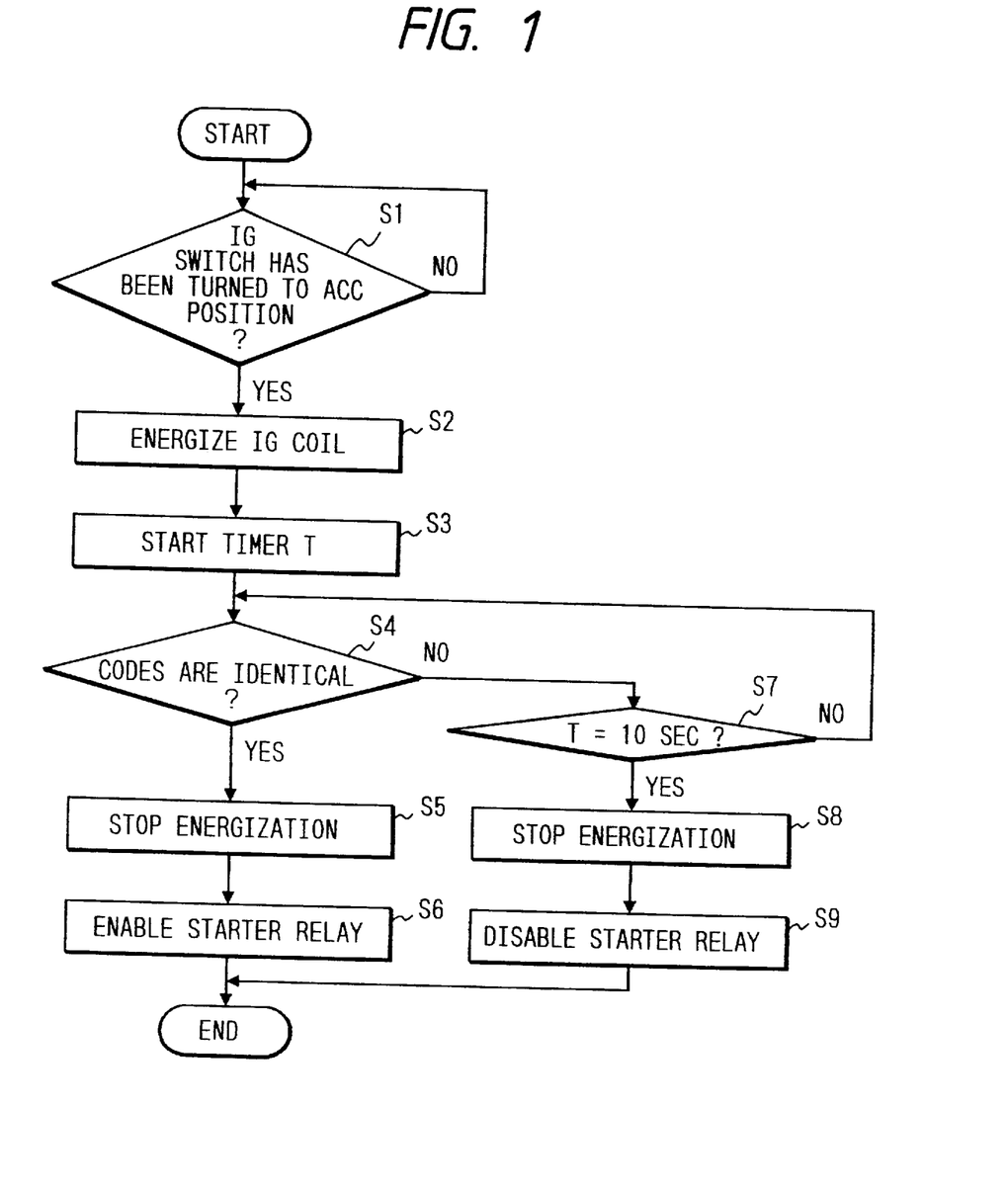
FIG. 1 is a flowchart showing a conventional ignition auto-trigger input program.

That is, the controller performs a judgment operation according to, for instance, a flowchart of an ignition autotrigger input program as shown in FIG. 1. First, when key insertion into the ignition key cylinder is detected by the key position switch, the controller starts to execute the program. When the controller judges, based on a detection signal sent from the ignition switch, that the key rotor has been turned to the ACC position (step S1), it energizes the key coil to supply, as a trigger signal, a high-frequency signal to the key being inserted in the key cylinder (step S2).

Then, the controller starts a timer T which counts 10 seconds (step S3), and goes to step S4, where the controller receives an identification code signal sent from the key and compares it with an identification code stored (i.e., registered) in a memory to judge whether they are identical to each other. If the regular remote key is inserted, the controller should receive the correct identification code signal. In such a case, the judgment in step S4 should be YES, and, therefore, the controller stops energizing the key coil (step S5) and enables the starter relay for starting the engine. The execution of the program is finished.

On the other hand, when the identification code comparison result indicates a disagreement, in which case the judgment in step S4 is NO, the controller goes to step S7, where steps S4 and S7 are repeated to effect waiting until the count time of the timer T reaches 10 seconds. If no agreement is found between the identification codes for 10 seconds with the key coil continuously outputting the high-frequency signal, the controller stops energizing the key coil with a judgment that it has not received any identification code signal or an irregular remote key is inserted in the ignition key cylinder (step S8). Further, controller disables the starter relay (step S9) and finishes the execution of the program.

When no agreement is found between the identification codes for 10 seconds, there is a high possibility that a certain false activity is being done. Therefore, in the state that the key is inserted, the operation is disabled, and the detection signal from the ignition switch, which signal is produced by an operation on the ignition key cylinder, is also disabled, to prohibit starting of the engine.

However, in the conventional configuration as described above, while receiving the high-frequency signal from the key coil in the ignition key cylinder, the remote key outputs the identification code signal only once immediately after starting to receive the high-frequency signal. Therefore, it may be the case that the receiving circuit cannot correctly receive the identification code signal from the remote key due to mixing of radio wave noise, for instance. That is, even when the identification code signal is sent from the regular remote key, the identification comparison result in the controller may indicate a disagreement.

In the above situation, the user needs to pull out the remote key, again inserts it into the ignition key cylinder, and turns the key rotor to initiate the above comparison operation. But this is cumbersome to the user; that is, the above remote key is not easy to use.

SUMMARY OF THE INVENTION

The present invention has been made in view of the above circumstances in the art, and has an object of providing a vehicular antitheft apparatus in which a secondary battery as a DC power supply for a transmission circuit can be charged within a key, and which enables a judgment of whether a key being inserted in an ignition key cylinder is the regular one.

Another object of the invention is to provide a vehicular antitheft apparatus which can positively receive an identification code signal sent from the key even in a situation where radio wave noise etc. is mixed into the identification code signal, and which enables quick and correct recognition of the regular key.

According to the invention, a vehicular antitheft apparatus comprises:

an ignition key cylinder having a key rotor into which a key is to be inserted;

an ignition switch for producing a turn detection signal when detecting that the key rotor has been turned to a predetermined position;

means for outputting a high-frequency signal when receiving the turn detection signal;

the key including:

a secondary battery;

means for generating a constant DC voltage based on the high-frequency signal;

a charging circuit for charging the secondary battery with the generated constant DC voltage;

a transmission circuit powered by the secondary battery, for transmitting an air propagation signal including an identification code; and a timer circuit for allowing the transmission circuit to transmit the air propagation signal during a predetermined period after the generating means receives the high-frequency signal; and means for comparing the identification code included in the air propagation signal transmitted from the key and a preset identification code, and for producing a signal for allowing an engine to be started if the transmitted identification code and the preset identification code are identical.

According to another aspect of the invention, a vehicular antitheft apparatus comprises:

an ignition key cylinder having a key rotor into which a key is to be inserted;

an ignition switch for producing a turn detection signal when detecting that the key rotor has been turned to a predetermined position;

means for outputting a high-frequency signal when receiving the turn detection signal;

the key including a transmission circuit for transmitting an air propagation signal including an identification code in response to the high-frequency signal; and control means for comparing the identification code included in the air propagation signal transmitted from the key and a preset identification code, for producing a signal for allowing an engine to be started if the transmitted identification code and the preset identification code are identical, and for causing the outputting means to output the high-frequency signal at plural times with a cycle consisting of predetermined outputting and pause periods when the transmitted identification code does not coincide with the preset identification code at a first attempt.

DESCRIPTION OF THE PREFERRED EMBODIMENTS

A first embodiment of the present invention will be hereinafter described with reference to the accompanying drawings.

Figure 2:
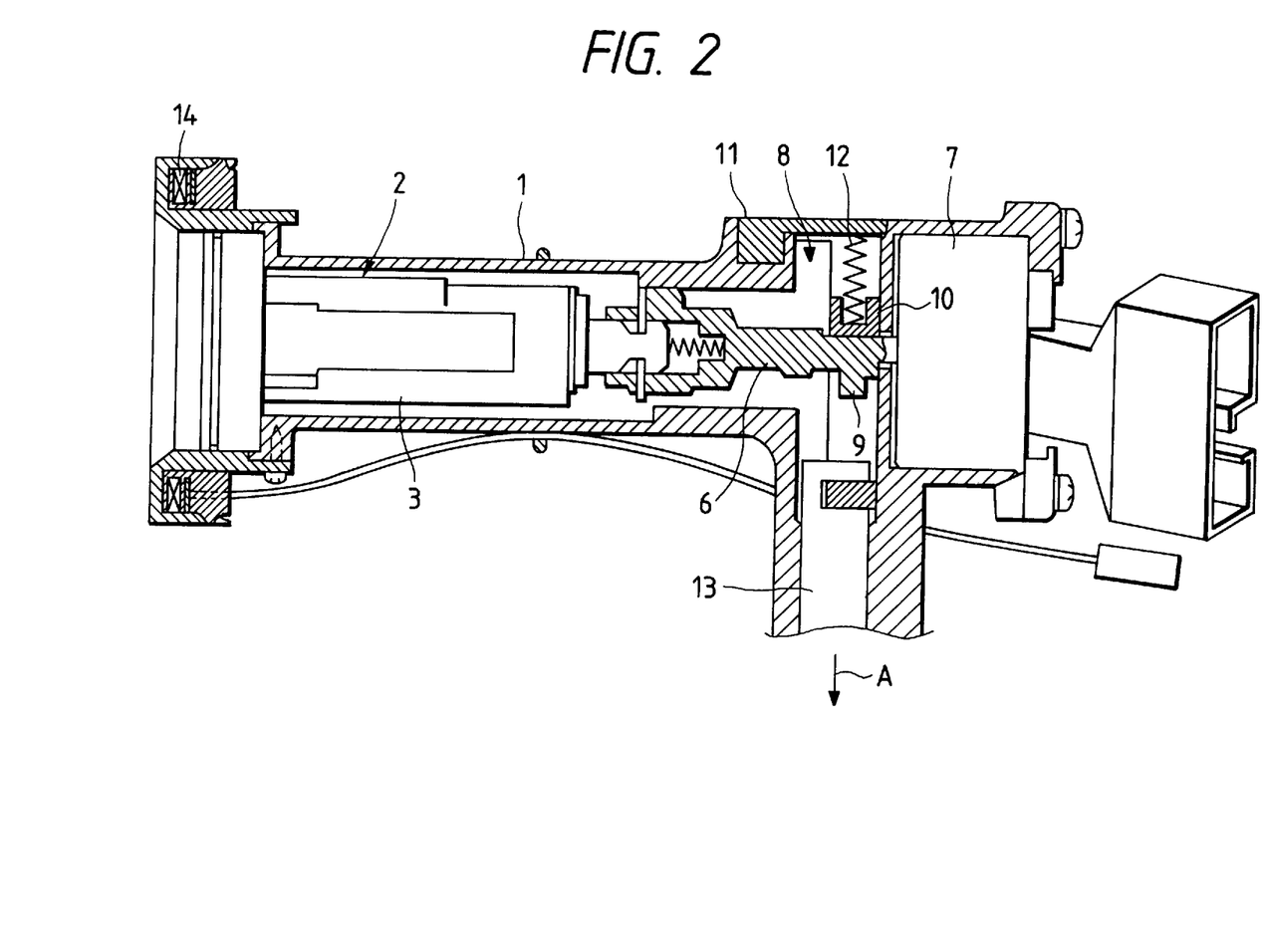
FIG. 2 is a sectional view of a key cylinder portion.
Figure 3:
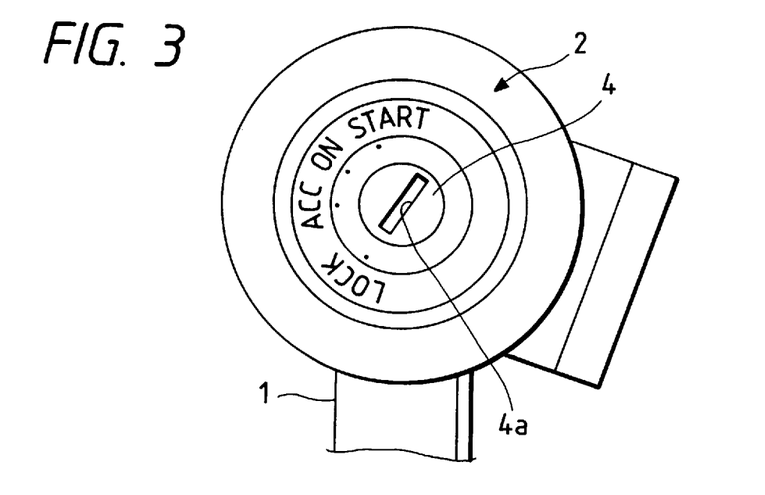
FIG. 3 is a front view of the key cylinder portion.

Referring to FIGS. 2 and 3, a cylinder base 1 is provided on a steering column (not shown) of an automobile. An ignition key cylinder 2 is mounted on the cylinder base 1. A key rotor 4 is rotatably disposed in a rotor case 3 of the key cylinder 2. When the key rotor 4 is at the LOCK position, a remote key 5 (see FIG. 4) can be inserted into and removed from a key insertion hole 4a. The key rotor 4 can be turned between the LOCK and START positions by means of the remote key 5 being inserted.

A cam shaft 6 is provided in the rear of the key rotor 4 so as to be rotatable together with the key rotor 4. An ignition switch 7 is provided in the rear of the cam shaft 6, and the state of the ignition switch 7 is changed in accordance with the turn of the cam shaft 6. The state of the ignition switch 7 is changed among OFF (LOCK), ACC, ON and ST (START) in accordance with the turning position of the key rotor 4 (see FIG. 4).

When the key rotor 4 is turned to the START position by the remote key 5 and an operation force on the remote key is released, not only dose the state of the ignition switch 7 return from ST to ON by an urging force of a restoration spring (not shown), but also the key rotor 4 automatically returns from the START position to the ON position by a force that is transmitted through the cam shaft 6.

A steering locking device 8 is attached to the cam shaft 6. As is well known, the steering locking device 8 consists of a cam 9 that is attached to the cam shaft 6, a frame member 10 that is moved by the cam 9, a compressed coil spring 12 that is disposed between the frame member 10 and a cover 11 and urges the frame member 10 toward a direction A indicated by an arrow in FIG. 2, and a lock bar 13 that is hooked on the frame member 10 and moves together with it. When the key rotor 4 of the key cylinder 2 is turned to the LOCK position and the remote key 5 is removed from the key rotor 4, a tip portion of the lock bar 13 is engaged with an engaging groove (not shown) on the steering shaft side, to lock the steering shaft and, as a result, the steering wheel.

Figure 4:
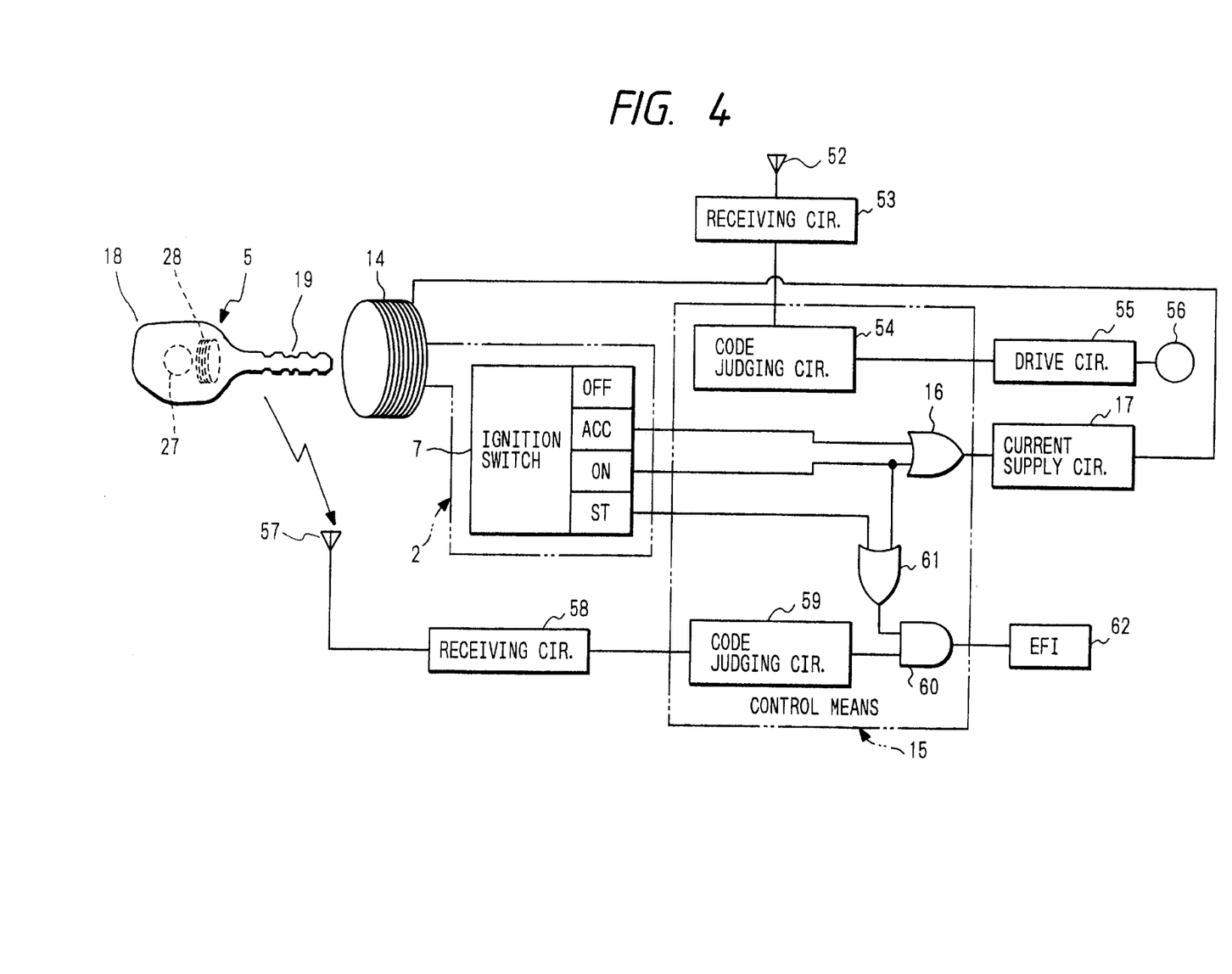
FIG. 4 is a block diagram showing a configuration of a vehicular antitheft apparatus according to a first embodiment of the present invention.

A primary coil 14 is disposed in front of the key cylinder 2. As shown in FIG. 4, a current supply circuit 17 supplies an AC current to the primary coil 14 based on a signal produced by an OR circuit 16 of a control means 15 when the ignition switch 7 is at the ACC or ON state.

Figure 5:
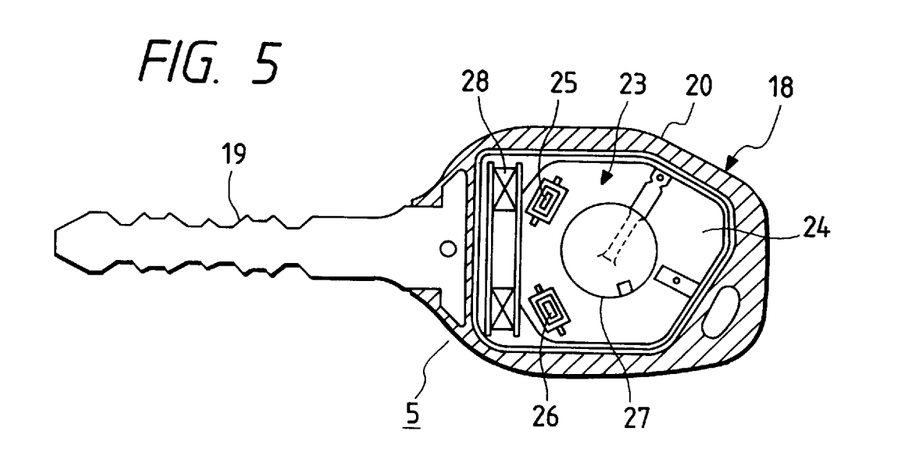
FIG. 5 is a horizontal sectional view of a remote key.
Figure 6:
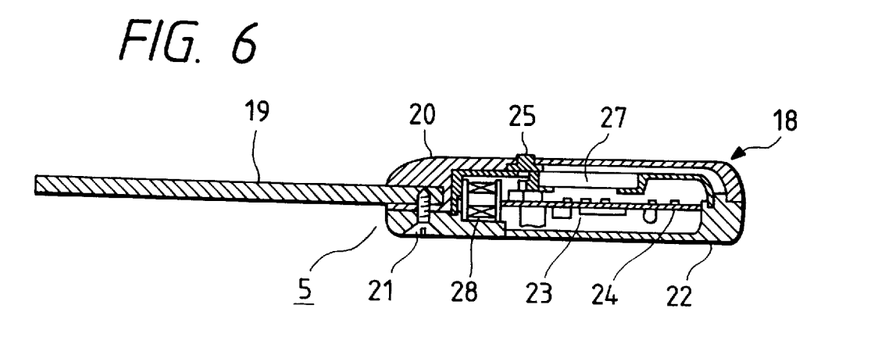
FIG. 6 is a vertical sectional view of the remote key.

As shown in FIGS. 5 and 6, a main body 18 as an implementation of a transmission function is incorporated in a base of the remote key 5. The main body 18 has a first case 20 that is so molded that a key portion 19 is inserted therein, and a second case 22 that is attached to the first case 20 with a screw 21 so as to over the opening thereof.

The main body 18 further has a printed circuit board 24 bearing a transmission circuit 23 (see FIG. 7), a push-buttontype locking switch 25 and unlocking switch 26 for initiating a transmission operation of the transmission circuit 23, a secondary battery 27 as a power supply for the transmission circuit 23, a secondary coil 28 that corresponds to the primary coil 14 on the key cylinder 2 side, and other parts. The transmission circuit 23 transmits a signal for remotecontrolling the locking or unlocking of doors of an automobile.

Figure 7:
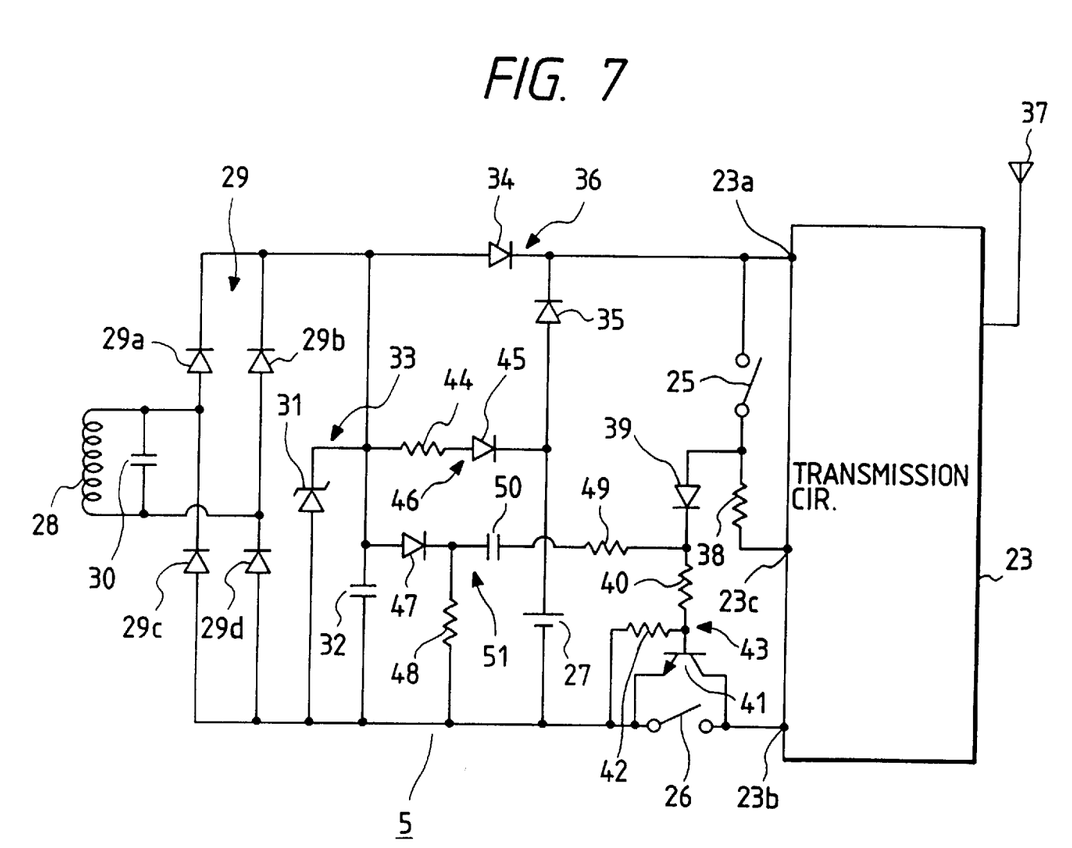
FIG. 7 shows a circuit incorporated in the remote key according to the first embodiment of the invention.

Now, referring to FIG. 7, an electrical configuration on the side of the main body 18 of the remote key 5 will be described. A full-wave rectifier circuit 29 consists of bridge-connected diodes 29a–29d, and a parallel circuit of the secondary coil 28 and a capacitor 30 is connected between AC input terminals of the rectifier circuit 29. And a parallel circuit of a constant voltage diode 31 and a capacitor 32 is connected between DC output terminals of the rectifier circuit 29. Thus, a constant voltage circuit 33 is constituted. Further, a series circuit of reverse current preventing diodes 34 and 35 and the secondary battery 27 is connected, in parallel, to the capacitor 32. The cathode of the diode 34 is connected to a positive power input terminal 23a of the transmission circuit 23 and the negative terminal of the secondary battery 27 is connected to a negative power input terminal 23b of the transmission circuit 23 through the abovementioned unlocking switch 26. The reverse current preventing diodes 34 and 35 constitute a power supply circuit 36.

The transmission circuit 23 has an additional input terminal, i.e., a signal input terminal 23c. In the state that a DC voltage is applied between the positive and negative power input terminals 23a and 23b, the transmission circuit 23 outputs an air propagation signal (in this case, a radio signal) from an antenna 37, the air propagation signal being the lock signal and the unlock signal when the signal at the signal input terminal 23c is at the high level and low level, respectively.

A series circuit of the above-mentioned locking switch 25 and a resistor 38 is connected between the positive power input terminal 23a and the signal input terminal 23c of the transmission circuit 23. Further, the connecting point of the locking switch 25 and the resistor 38 is connected to the base of an npn transistor 41 through a reverse current preventing diode 39 and a resistor 40. The emitter and collector of the transistor 41 are connected to the respective terminals of the unlocking switch 26, and a resistor 42 is connected between the base and emitter of the transistor 41. Thus, a switching circuit 43 is constituted.

A resistor 44 and a reverse current preventing diode 45 are connected, in series, between the cathode of the constant voltage diode 31 and the positive terminal of the secondary battery 27, to form a charging circuit 46.

A diode 47, resistors 48 and 49 and a capacitor 50 constitute a timer circuit 51. That is, the anode of the diode 47 is connected to the cathode of the constant voltage diode 31, and the cathode of the diode 47 is connected to the negative terminal of the secondary battery 27 through the resistor 48 and also connected to the cathode of the diode 39 through the capacitor 50 and the resistor 49.

With the above configuration, when the locking switch 25 is operated to turn on, the transistor 41 is turned on to thereby allow the DC voltage of the secondary battery 27 to be applied between the positive and negative power input terminals 23a and 23b of the transmission circuit 23 and a high-level signal to be applied to the signal input terminal 23c. Thus, the transmission circuit 23 emits a lock signal from the antenna 37. On the other hand, when the unlocking switch 26 is operated to turn on, the DC voltage of the secondary battery 27 is applied between the positive and negative power input terminals 23a and 23b of the transmission circuit 23 and a low-level signal is applied to the signal input terminal 23c. Thus, the transmission circuit 23 emits an unlock signal from the antenna 37.

The radio signal emitted from the transmission circuit 23 is received by an antenna 52 (see FIG. 4) of the automobile. The radio signal is a code signal of several tens of bits. In the case of the lock signal, the code is a combination of a locking code and a particular code specified for each automobile. In the case of the unlock signal, the code is a combination of an unlocking code and the same particular code.

As shown in FIG. 4, the radio signal as received by the antenna 52 is sent to a code judging circuit 54 of the control means 15 through a receiving circuit 53. The code judging circuit 54 judges both whether the received radio signal includes the particular code specified for the associated automobile and whether it includes the locking code or unlocking code. If the received radio signal includes the particular code and the locking code, the code judging circuit 54 supplies a lock driving signal to a door locking device 56 through a drive circuit 55 to effect door locking. If the received radio signal includes the particular code and the unlock signal, the code judging circuit 54 supplies an unlock signal to the door locking device 56 through the drive circuit 55 to release door locking.

On the other hand, as shown in FIG. 4, an antenna 57 that is separate from the antenna 52 is disposed in the vicinity of the key cylinder 2. A radio signal transmitted from the transmission circuit 23 is received by the antenna 57, and then sent to a code judging circuit 59 of the control means 15. The code judging circuit 59 judges whether the received radio signal includes the particular code specified for the associated automobile. If the judgment is affirmative, the code judging circuit 59 supplies an output signal to an AND circuit 60.

The output terminal of the code judging circuit 59 and the output terminal of an OR circuit 61 are connected to the respective input terminals of the AND circuit 60. The OR circuit 61 supplies an output signal to the AND circuit 60 when the ignition switch 7 is rendered in the ON or ST state.

The AND circuit 60 allows starting of the engine only when it receives signals from both of the OR circuit 61 and the code judging circuit 59 by allowing operation of an EFI (electronic fuel injection device) 62, for instance. In other situations, the AND circuit 60 prohibits starting of the engine by prohibiting operation of the EFI 62 even when the key rotor 4 is turned.

Although actually the control means 15 is implemented as a microcomputer and peripheral circuits and performs its control operation according to software, FIG. 4 is drawn, for convenience of description, as a block diagram including function blocks for performing the operation that is necessary in this embodiment.

Next, the operation of this embodiment will be described.

It is now assumed that a driver has inserted the remote key 5 into the key insertion hole 4a of the key cylinder 2 to start the engine. At the instant when the remote key 5 is inserted into the key cylinder 2, the key rotor 4 is at the LOCK position and the ignition switch 7 is in the OFF state. When the key rotor 4 is turned to the ACC position by the remote key 5, the OR circuit 16 supplies an output signal to the current supply circuit 17, which then operates to supply an AC current to the primary coil 14.

As the AC current flows through the primary coil 14, a voltage is induced across the secondary coil 28. The induced voltage is rectified by the full-wave rectifier circuit 29, and then regulated by the constant voltage circuit 33. Thus, a constant DC voltage is output from the constant voltage circuit 33. The constant DC voltage causes a base current to flow through the transistor 41 through the timer circuit 51 to turn on the transistor 41. As a result, the constant DC voltage of the constant voltage circuit 33 or the DC voltage of the secondary battery 27 is applied between the positive and negative power input terminals 23a and 23b of the transmission circuit 23 through the power supply circuit 36.

In this case, the locking switch 25 is off and, therefore, a low-level signal is applied to the signal input terminal 23c of the transmission circuit 23. Therefore, the transmission circuit 23 operates to transmit an unlock signal from the antenna 37. When the timer circuit 51 stops supplying the base current to the transistor 41 after a lapse of a predetermined time, the transistor 41 is turned off. With the supply of the DC voltage cut off, the transmission circuit 23 stops its transmission operation. That is, the transmission circuit 23 transmits the unlock signal during a predetermined period after the constant DC voltage was generated by the constant voltage circuit 33.

The unlock signal, i.e., the radio signal, transmitted from the transmission circuit 23 in the above manner is received by the antenna 57 located in the vicinity of the ignition cylinder 2, and then sent to the code judging circuit 59 through the receiving circuit 58. The code judging circuit 59 judges whether the radio signal includes the particular code. If the judgment is affirmative, the code judging circuit 59 supplies an output signal to the AND circuit 60.

When the driver turns the key rotor 4 to the START position by the remote key 5 being inserted in the key cylinder 2, the ignition switch 7 is rendered into the ST state. As a result, the AND circuit 60 allows the operation of the EFI 62, and the engine is started by a starter (not shown).

When the turning force on the remote key 5 is released after the engine was started by turning the key rotor 4 to the START position, the state of the ignition switch 7 is changed from ST to ON, and the key rotor 4 is automatically turned from the START position to the ON position and held there.

Assume here that a person other than the driver having the normal remote key 5 inserts a false thing into the key insertion hole 4a of the key cylinder 2 and turns the key rotor 4 to the START position to start the engine of the automobile. In this case, the state of the ignition switch 7 is changed to ST. However, unless an output signal of the code judging circuit 59 is input to the AND circuit 60, the EFI 62 is prevented from operating and, therefore, the engine cannot be started even if the key rotor is turned. Further, even if a false key is inserted into the key cylinder 2 and it is caused to transmit a certain radio signal, the engine still cannot be started without code matching. Making it impossible to start the engine by a false means, this embodiment has a remarkable antitheft effect.

On the other hand, while the engine is driven after being started by use of the regular remote key 5, the ignition switch 7 is kept in the ON state. In this state, an output signal is supplied from the OR circuit 16 to the current supply circuit 17, which supplies an AC current to the primary coil 14.

While the AC current is supplied to the primary coil 14 in the above manner, in the remote key 5 the secondary battery 27 is charged through the charging circuit 46 by the constant DC voltage (produced from an induced voltage across the second coil 28) from the constant voltage circuit 33. In this manner, the secondary battery 27 is charged while the engine is driven, to prevent the secondary battery 27 from being used up. Thus, it can be avoided that the transmission circuit 23 is disabled by the secondary battery being used up.

In the above embodiment, when the remote key 5 is inserted into the key cylinder 2 and the key rotor 4 is turned to the ACC position, the signal from the OR circuit 16 causes the power supply circuit 17 to operate. Alternatively, for example, the power supply circuit 17 may be caused to operate in response to detection of the insertion of the remote key 5 into the key cylinder 2 by an added key detecting means. In essence, it suffices that the primary coil 14 is energized in response to the insertion of the remote key 5 into the key cylinder 2.

Although in the above embodiment the unlock signal for the door lock releasing is utilized as the particular code signal for allowing the engine starting, a dedicated signal may be used.

Further, although the radio signal is used as the air propagation signal in the above embodiment, an ultrasonic signal or an infrared signal may be used instead.

A second embodiment of the invention will be hereinafter described with reference to FIGS. 8 and 9.

Figure 8:
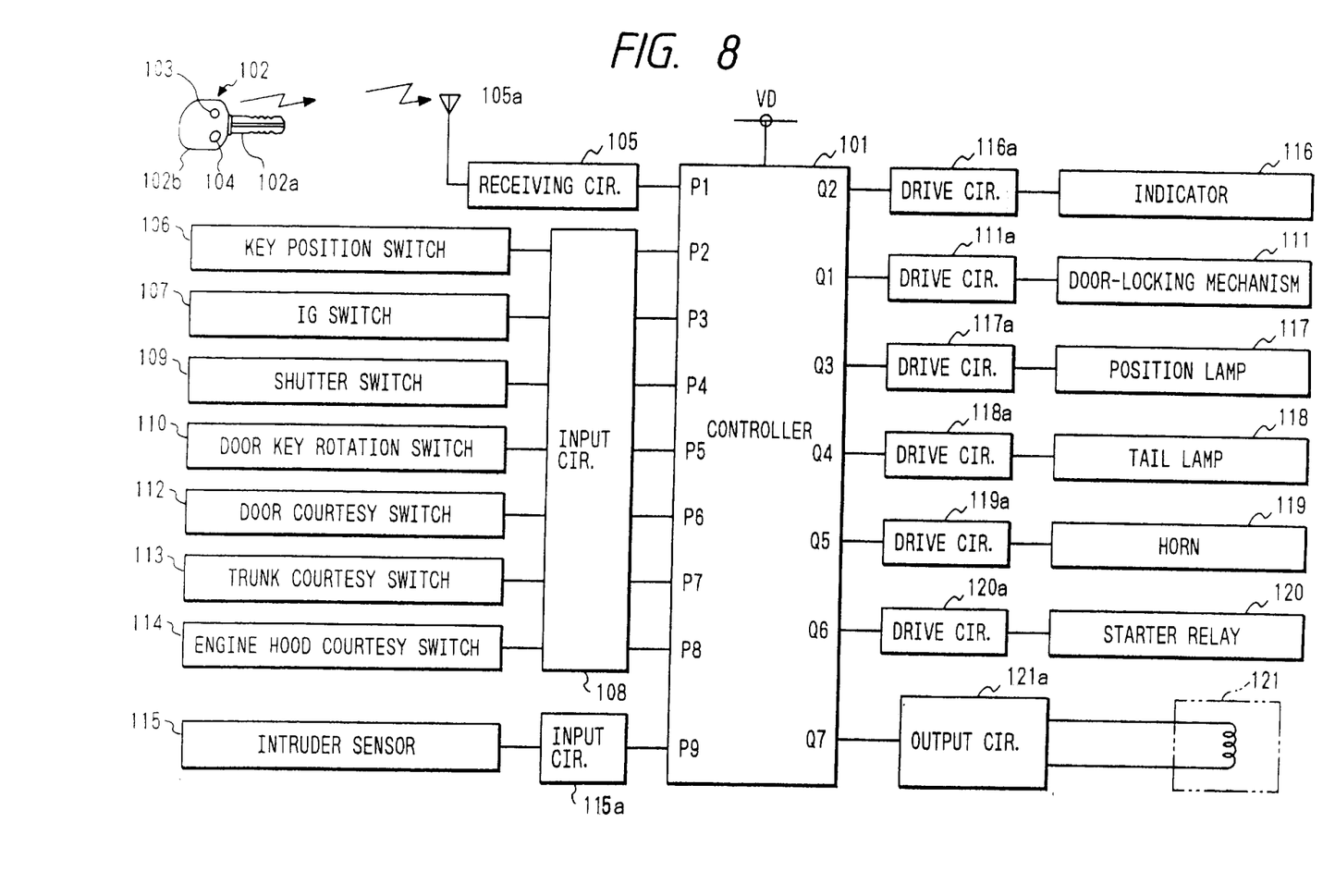
FIG. 8 is a block diagram showing a configuration of a vehicular antitheft apparatus according to a second embodiment of the invention.

Referring to FIG. 8 showing an electrical configuration, a controller 101 for performing the total control of a security system provided in the main body (not shown) of an automobile as a vehicle includes a CPU, a ROM and a RAM. Not only a main program but also a program for an auto-trigger input operation is stored in the controller 101.

A remote key 102, which serves to remote-control locking and unlocking operations on doors (not shown) of the automobile, consists of a key plate 102a that functions as a key for mechanically effecting opening/closing of a door and a key grip 102b for holding the key plate 102a. The remote key 102 also has a function as a code signal outputting means. The key grip 102b incorporates a locking switch 103 for lock signal transmission and an unlocking switch 104 for unlock signal transmission. When one of these switches is depressed, a transmission circuit (not shown) that is incorporated in the key grip 102b transmits a lock signal or unlock signal that includes an identification code signal as a particular code in the form of a radio signal (air propagation signal).

On the other hand, a receiving circuit 105 for receiving the radio signal that is transmitted from the remote key 102 is provided on the automobile side. The receiving circuit 105 is connected to an input terminal P1 of the controller 101. When receiving the radio signal through an antenna 105a, the receiving circuit 105 demodulates it into the lock signal or unlock signal, which is input to the controller 101.

A key position switch 106 for detecting insertion of the key plate 102a of the remote key 102 and an ignition switch (hereinafter referred to as "IG switch") 107 for detecting the turning position in an ignition key cylinder (hereinafter referred to as "IG key cylinder") are incorporated in the IG key cylinder that is installed adjacent to the driver's seat. The IG switch 107 detects one of the following four turning positions: an OFF position, an ACC position for turning on the power for accessory devices, an ON position for the engine operating state, and an ST position for activating a starter. The key position switch 106 and the IG switch 107 are respectively connected to input terminals P2 and P3 of the controller 101 through an input circuit 108.

A door key cylinder is provided in the door (not shown) so as to allow the insertion and turning of the key plate 102a of the remote key 102. A shutter is provided in the door key cylinder insertion portion, and a shutter switch 109 is also provided to detect insertion of the key plate 102a into the door key cylinder by detecting the open state of the shutter. Also provided is a key rotation switch 110 for detecting the turning of the door key cylinder from an off position to a locking direction or unlocking direction. Output terminals of the shutter switch 109 and the key rotation switch 110 are respectively connected to input terminals P4 and P5 of the controller 101 through the input circuit 108.

A door locking mechanism 111 that is driven in accordance with the turning of the door key cylinder is installed in the door. That is, the door locking mechanism 111 performs a locking and unlocking operation for the door key cylinder's turning in the locking and unlocking direction, respectively. As described later, the door locking mechanism 111 also performs the locking and unlocking operation when receiving a lock signal and unlock signal, respectively, from an output terminal Q1 of the controller 101 through a drive circuit 111a.

A door courtesy switch 112 that is provided for each door to detect its open/closed state is connected to an input terminal P6 of the controller 101 through the input circuit 108. (The door courtesy switch 112 for one door is representatively shown in FIG. 8.)

A trunk courtesy switch (hereinafter referred to as "T courtesy switch") 113 and an engine hood courtesy switch (hereinafter referred to as "EH courtesy switch") 114 that are provided to detect the open/closed states of a trunk and an engine hood (both not shown) are connected to input terminals P7 and P8, respectively, of the controller 101 through the input circuit 108.

An intruder sensor 115 is provided in the vehicle compartment, and outputs a detection signal when detecting an object intruding into the compartment. For example, the intruder sensor 115 is an infrared pyroelectric sensor or an ultrasonic sensor. A signal output terminal of the intruder sensor 115 is connected to an input terminal P9 of the controller 101 through the input circuit 115a.

An indicator 116 is an indication lamp provided in an indication panel adjacent to the driver's seat. Receiving a drive signal from an output signal Q2 of the controller 101 through a drive circuit 116a, the indicator 116 performs its indicating operation (described later) by being turned on in accordance with the drive signal.

A position lamp 117 and a tail lamp 118 are auxiliary lamps that are turned on at night or dusk, and also function as alarm devices. The lamps 117 and 118 are turned on in accordance with control signals sent from output terminals Q3 and Q4 of the controller 101 through drive circuits 117a and 118a, respectively. A horn 119 that also functions as an alarm device blows when receiving a control signal from an output terminal Q5 of the controller 101 through a drive circuit 119a.

A starter relay 120 allows a starter for starting the engine to operate, and is enabled by a drive signal that is sent from an output terminal Q6 of the controller 101 through a drive circuit 120a when the IG switch 107 has detected that the IG key cylinder is at the ON or ST position.

A key coil 121 is provided inside the IG key cylinder, and connected to a terminal Q7 of the controller 101 through an output circuit 121a. When the key plate 102a of the remote key 102 is inserted into the key cylinder and turned therein and the IG switch 107 detects that the IG key cylinder has been turned to the ACC position, the controller 101 supplies an AC current to the key coil 121 through the output circuit 121a to cause the key coil to send a high-frequency signal (i.e., a trigger signal) to the remote key 102. In response, the transmission circuit of the remote key 102 transmits an identification code signal as a particular code signal.

Next, the operation of this embodiment will be described with reference to a flowchart of an IG auto-trigger input program shown in FIG. 9.

In a state that an automobile is stopped with its all doors closed, when a lock signal is transmitted toward the automobile from the remote key 102 that is located outside the automobile, the controller 101 not only forwards a lock signal to the door-locking mechanism to effect its locking operation, but also initiates a guard mode. In the guard mode, the controller 101 activates the intruder sensor 115, and is rendered capable of receiving a detection signal thereof. Further, the controller 101 is rendered in a state of monitoring the door courtesy switch 112, T courtesy switch 113 and EH courtesy switch 114 by receiving detection signal thereof.

When receiving an unlock signal from the remote key 102 during the guard mode, the controller 101 forwards an unlock signal to the door-locking mechanism to effect its unlocking operation, and cancels the guard mode. When someone intrudes into the automobile by forcibly opening the door or by breaking the window glass, the controller initiates an alarming operation based on detection signals from the respective courtesy switches 112–114 or a detection signal from the intruder sensor 115.

In the alarming operation, the controller 101 supplies flash driving signals to the position lamp 117 and the tail lamp 118 through the drive circuits 117a and 118a, respectively. Further, the controller 101 supplies a blowing signal to the horn 119 through the drive circuit 119a to cause the horn 119 to intermittently blow, to thereby attract attention of persons around the automobile and force the intruder to abandon his false activity.

In the above manner, the guard mode serves to prevent a false activity while the automobile is parked, for instance. In addition, when a key is inserted into the IG key cylinder in a state that the automobile is stopped, it is judged in the following manner whether the inserted key is the regular remote key 102.

Figure 9:
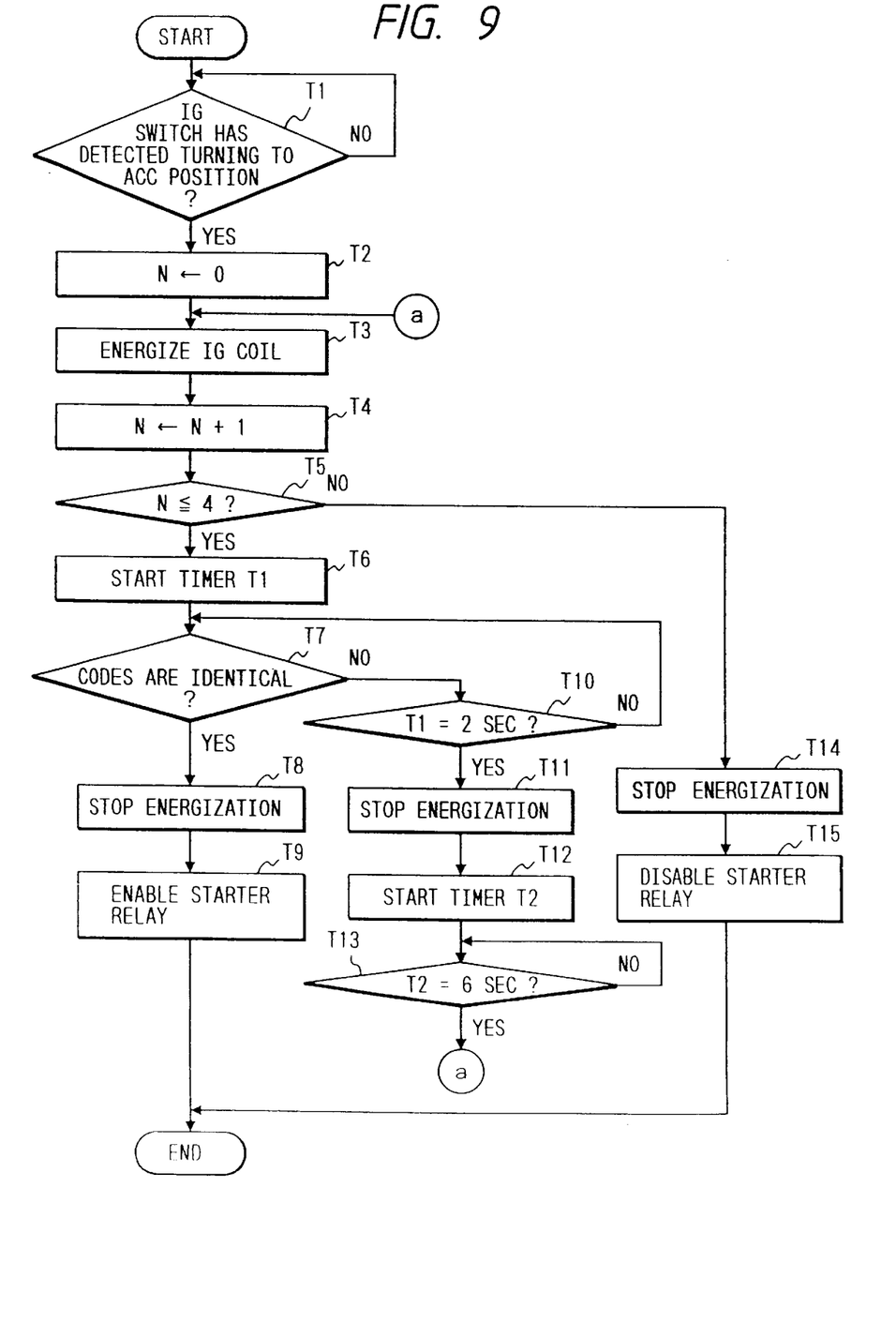
FIG. 9 is a flowchart showing an ignition auto-trigger input program according to the second embodiment of the invention.

The controller 101 performs its judgment operation according to the flowchart of the IG auto-trigger input program shown in FIG. 9. First, after the key position switch 106 detects insertion of a key into the IG key cylinder, the IG switch 107 detects that the IG key cylinder has been turned to the ACC position (step T1), and the controller 101 substitutes "0" into a value N of a internal counter (step T2) and then energizes the key coil 121 to cause it to send a high-frequency signal toward the key inserted in the key cylinder (step T3).

In response to the high-frequency signal received from the key coil 121, the transmission circuit of the remote key 102 transmits an unlock signal. The unlock signal is received by the receiving circuit 105 through the antenna 105a and demodulated therein, and then input to the controller 101 as an identification code signal.

Then, the controller 101 adds 1 to the value N of the internal counter in step T4. If the value N of the counter is not larger than 4 (the judgment in step T5 is YES), the process goes to step T6, where an internal timer T1 is started.

Then, the controller 101 judges whether the identification code of the unlock signal as sent from the remote key 102 coincides with an identification code stored in advance (step T7). If the judgment is YES, the process goes to step T8.

This is the case where the regular remote key 102 was inserted into the IG key cylinder and turned therein, and the unlock signal received by the receiving circuit 105 has been demodulated correctly. The controller 101 has successfully recognized the unlock signal by one operation. In this case, the controller 101 stops energizing the key coil 121 (step TB), and enables the starter relay 22 (step T9). And the program execution is finished.

On the other hand, if the judgment in step T7 is NO, that is, if the identification code as received by the receiving circuit 105 does not coincide with the stored identification code, the process goes to step T10. Waiting is thereafter effected such that steps T7–T10 are repeated until the timer T1 shows an elapsed time of 2 seconds.

If the judgment in step T7 has not changed to YES in the 2-second period, the controller 101 judges YES in step T10, stops energizing the key coil 121 in step T11, and starts an internal timer T12 in step T13. Waiting is thereafter effected such that step T13 is repeated until 6 seconds elapse.

When an elapsed time measured by the timer T2 has reached 6 seconds, the process returns to step T3, where the controller 101 again energizes the key coil 121 to cause it to send a high-frequency signal. In response, the remote key 102 transmits an unlock signal including the identification code. The controller 101 adds 1 to the value N of the internal counter (N becomes 2) in step T4, executes step T5, and starts the internal timer T1 in step T6.

In the same manner as described above, the controller 101 compares the identification code as received by the receiving circuit 105 (step T7). If the identification codes are identical, the controller 101 executes steps T8 and T9 to complete the program execution. If they are not identical, the process returns to step T3 to repeat the above steps. In the first repetition, the value N of the internal counter becomes 3 in step T4.

By repeating the code comparing operation in the above manner, the code coincidence can be recognized successfully with the remote key 102 kept inserted in the IG key cylinder even where, for instance, the identification code signal sent from the regular remote key 102 being inserted in the IG key cylinder is not received correctly in the first receiving attempt of the receiving circuit 105 due to mixing of external noise or the like.

When the value N of the internal counter becomes 5 in the course of the repetitions, the judgment in step T5 becomes NO, and the process goes to step T14, where the controller 101 stops energizing the key coil 121. Then, the controller 101 disables the starter relay 122 in step T15, and completes the program execution. This operation means that when the received identification code does not coincide with the stored identification code even with four times of comparing operations, it is judged that the key inserted in the IG key cylinder is not the regular remote key 102. This is to prevent an activity of falsely starting the engine by using a skeleton key, for instance.

As described above, according to this embodiment, when the remote key 102 is inserted into the IG key cylinder and then turned to the ACC position, the controller 101 causes the key coil 121 to send a high-frequency signal to the remote key 102 to thereby make it output an identification code signal. When the identification code sent from the remote key 102 does not coincide with the stored identification code, the procedure of causing the key coil 121 to again send a high-frequency signal is performed a maximum of three times . Therefore, the code coincidence can be recognized successfully with the remote key 102 kept inserted in the IG key cylinder even where, for instance, the identification code signal sent from the regular remote key 102 being inserted in the IG key cylinder is not received correctly in the first identification code receiving attempt due to mixing of external noise or the like to result in a disagreement between the identification codes. This will provide improved ease of operation to a user.

Although in the above operation the number of times of outputting a trigger signal when the identification codes do not coincide with each other is set at three, the invention is not limited to such a case but it may be set at any proper number when necessary.

Although in the above embodiment the setting time of the timer T2, i.e., the time interval until outputting of the next trigger signal is set at 6 seconds, it may be shorter or longer than 6 seconds. That is, the setting time of the timer T2 may be any proper period when necessary.

Further, although the radio signal is used as the air propagation signal in the above embodiment, the invention is not limited to such a case and an optical signal such as infrared light or an ultrasonic signal may also be used.

Although the above two embodiments are described for the case of using the remote key that has the locking and unlocking switches, this is not the requisite of the invention. That is, the invention requires the key to be at least of the transponder type in which the key transmits the identification code when receiving power externally (from the vehicle).

As is apparent from the above description, according to the invention, the secondary battery can be charged by inserting the remote key having the transmission circuit and the secondary battery therefor into the ignition key cylinder. As a result, the secondary battery is prevented most effectively from losing its energy, and it can be avoided that the transmission circuit is disabled by the secondary battery being used out. Further, since the transmission circuit transmits the particular code in response to the insertion of the remote key into the ignition key cylinder, it can be easily judged whether an object inserted in the key cylinder is the regular remote key.

Further, according to the invention, when the particular code that is sent from the remote key in response to the trigger signal as output from the trigger signal output means energized by the control means does not coincide with the stored identification code, the procedure of producing the trigger signal and performing the code comparing operation after a lapse of a predetermined period is performed plural times. Therefore, the power-on signal can be enabled by performing the code comparing operation plural times even where, for instance, the transmission of the regular particular code signal does not result in a coincidence between the particular codes in the first comparing operation due to mixing of external noise or the like. This will enable positive recognition of the code coincidence and provide improved ease of operation, which are superior advantages.

What is claimed is:

1. A vehicular antitheft apparatus comprising:
an ignition key cylinder having a key rotor into which a key is to be inserted;
an ignition switch for producing a turn detection signal when detecting that the key rotor has been turned to a predetermined position;

means for outputting a high-frequency signal when receiving the turn detection signal;

the key including:

a secondary battery;

means for generating a constant DC voltage based on the high-frequency signal;

a charging circuit for charging the secondary battery with the generated constant DC voltage;

a transmission circuit powered by the secondary battery, for transmitting an air propagation signal including an identification code; and a timer circuit for allowing the transmission circuit to transmit the air propagation signal during a predetermined period after the generating means receives the high-frequency signal; and means for comparing the identification code included in the air propagation signal transmitted from the key and a preset identification code, and for producing a signal for allowing an engine to be started if the transmitted identification code and the preset identification code are identical.

2. The vehicular antitheft apparatus of claim 1, wherein the predetermined position of the key rotor is an accessory position.

3. The vehicular antitheft apparatus of claim 1, wherein the air propagation signal is an unlock signal for a wireless door-locking apparatus.

4. A key comprising:

a secondary battery;

means for receiving a high-frequency signal;

means for generating a constant DC voltage based on the high-frequency signal;

a charging circuit for charging the secondary battery with the generated constant DC voltage;

a transmission circuit powered by the secondary battery, for transmitting an air propagation signal including an identification code; and a timer circuit for allowing the transmission circuit to transmit the air propagation signal during a predetermined period after the generating means receives the high-frequency signal.

5. A vehicular antitheft apparatus comprising:

an ignition key cylinder having a key rotor into which a key is to be inserted;

an ignition switch for producing a turn detection signal when detecting that the key rotor has been turned to a predetermined position;

means for outputting a high-frequency signal when receiving the turn detection signal;

the key including a transmission circuit for transmitting an air propagation signal including an identification code in response to the high-frequency signal; and control means for comparing the identification code included in the air propagation signal transmitted from the key and a preset identification code, for producing a signal for allowing an engine to be started if the transmitted identification code and the preset identification code are identical, and for causing the outputting means to output the high-frequency signal at plural times with a cycle consisting of predetermined output and pause periods if the transmitted identification code does not coincide with the preset identification code in a first attempt.

6. The vehicular antitheft apparatus of claim 5, wherein the predetermined position of the key rotor is an accessory position.

* * * * *